No. 878,136. PATENTED FEB. 4, 1908.
M. HENIUS.
BREW HOUSE EQUIPMENT.
APPLICATION FILED APR. 19, 1907.
2 SHEETS—SHEET 2.
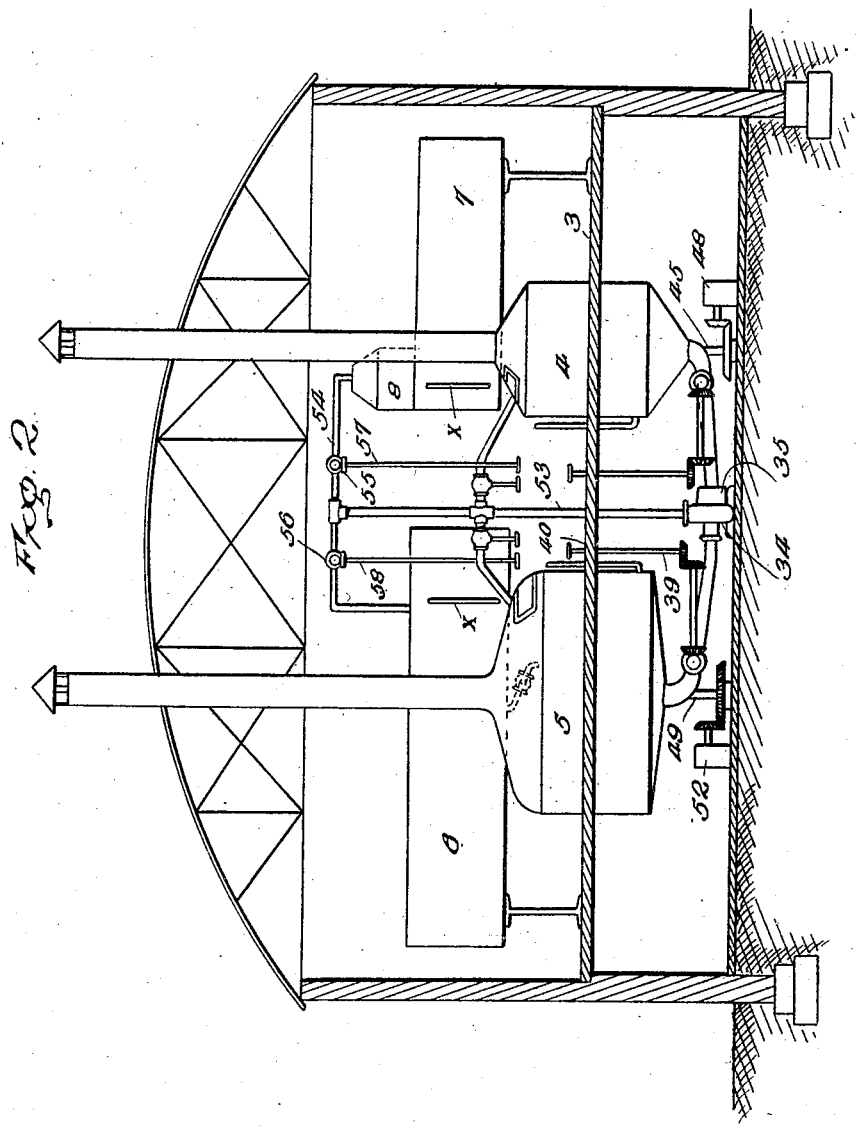
Inventor
Max Henius.
Witnesses

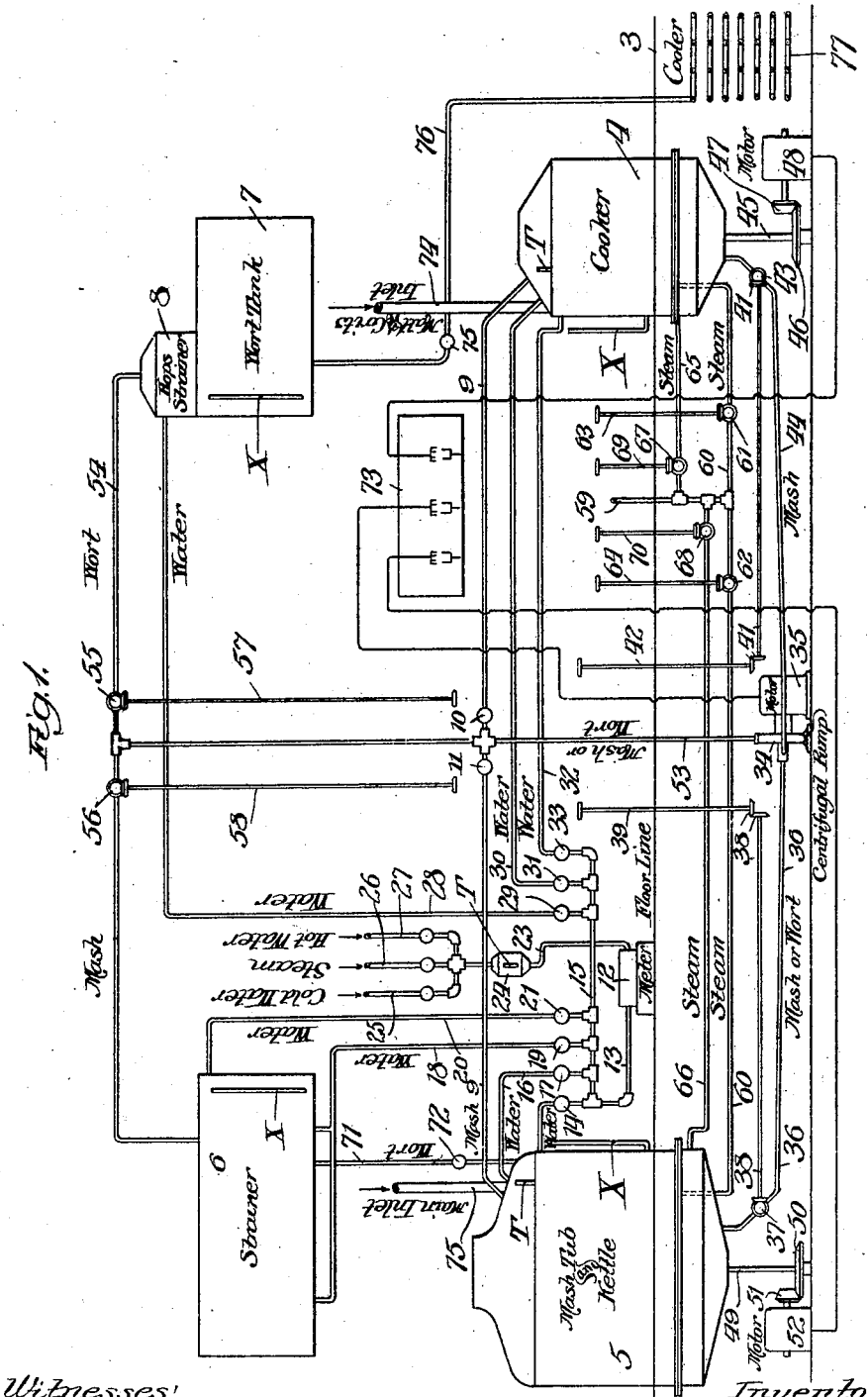

UNITED STATES PATENT OFFICE.

MAX HENIUS, OF CHICAGO, ILLINOIS.

BREW-HOUSE EQUIPMENT.

No. 878,136.

Specification of Letters Patent.

Patented Feb. 4, 1908.

Application filed April 19, 1907. Serial No. 369,067.

*To all whom it may concern:*

Be it known that I, MAX HENIUS, a citizen of the United States, residing at Chicago, in the county of Cook and State of Illinois, have invented a new and useful Improvement in Brew-House Equipment, of which the following is a specification.

The simplest form of modern brew-house equipment hitherto devised involves the disposition of the various apparatus employed in producing the wort on a plurality of floors in the building. This is objectionable because it necessitates the employment of a number of men to attend to the brewing of the wort, who are required to climb stairways to inspect and manipulate different parts of the apparatus, which is in need of constant attention and careful watching.

The trend of improvement in latter years in brew-house equipment has been in the direction of curtailment of the number of apparatus employed for the different operations in manufacturing the wort, and this has been made possible by adapting different parts of the apparatus, each of which had been customarily used for a single operation, to serve for a plurality of the operations; and I employ this improvement in my present invention. However, the extent of improvement of the nature thus outlined has marked a mere step toward the possible extent of simplification of a brew-house-apparatus equipment, which is fully attained by my invention, whereby all of the apparatus required to be employed, and occupying the same floor, may conveniently and easily be run by one man, who is enabled to inspect and control them all from a single point.

Referring to the accompanying drawings—Figure 1 is a view in elevation, in the nature of a diagram, illustrating my improved brew-house-apparatus equipment, and Fig. 2 is a view in vertical sectional elevation of a brew-house equipped in accordance with my invention.

The gist of my invention lies in centering about a single point on the brew-house floor, on which the entire apparatus employed in producing the wort is located, all the controlling means for governing and inspecting the operation of the different parts, whereby all such means are rendered conveniently accessible to the manipulation and view of a single operator whose position of duty is at such centering point.

The diagrammatic view presented in Fig. 1 discloses all the apparatus and connections required in a brew-house equipment: The working-floor is represented by the line 3; the receptacle used as the cooker is shown at 4, the receptacle used for the twofold purpose of a mash-tub and hop-kettle is shown at 5, the strainer-tub at 6, and the wort-tank at 7 surmounted by a hop-strainer 8.

Each receptacle is shown to be provided with a sight-glass X and a thermometer indicated at T. Between the vessels 4 and 5 extends a pipe 9 containing shut-off valves indicated at 10 and 11. A water-meter 12 having a distributing discharge-pipe 13 communicates with the vessel 5 through the pipe 13 containing a shut-off valve 14, and with which is connected a pipe 15, in the nature of a header, having a branch 16 containing a shut-off valve 17 and leading into the top of the vessel 5, a branch 18 containing a similar valve 19 and leading into the strainer 6 at the base thereof, and a branch 20 containing a similar valve 21, leading into the upper part of said strainer. A pipe 23 leads to the meter from a mixing chamber 24, equipped with a thermometer T and communicating with three valved pipes 25, 26 and 27, respectively for cold water, steam and hot water. A branch 28 containing a shut-off valve 29 leads to the hop-strainer 8, a branch 30 containing a similar valve leads to the top of the vessel 4, and a branch 32 containing a similar valve 33 leads into the vessel 4 below the pipe 30. A pump 34, of the preferred centrifugal type and operated by an electric motor 35, is connected by a pipe 36 containing a shut-off valve 37, with the bottom of the vessel 5, the valve having a miter-geared connection 38 with an upright rotatable operating rod extending to the central space 40 (Fig. 2) for occupancy by the operator. A similar connection 41 with an operating rod 42, also extending into said space, is made with a shut-off valve 43 in a pipe 44 connecting the pump with the hoppered bottom of the cooker, into which extends a rotatable shaft 45 for actuating the stirrer (not shown) provided therein, as usual, the shaft carrying a beveled gear 46 with which meshes a pinion 47 on the armature-shaft of an electric motor 48. A similar stirrer (also not shown) is provided in the vessel 5 on a vertical shaft 49 carrying a beveled gear 50 in mesh with a pinion 51 on the armature-shaft of an electric-motor 52. A pipe 53 rises vertically from the pump, crossing the pipe 9 between the valves 10 and 11, where it is coupled with that pipe, and whence it rises to and is coupled with a pipe 54 between shut-off valves 55 and 56 therein, the pipe 54 extending between the top of the strainer 6 and that of the hop-strainer 8. Operating rods 57 and 58, having miter-gear connections with the valves 55 and 56, depend from the latter into the aforesaid central space 40 for the operator. A steam-pipe 59, leading from a source of steam-supply (not shown) connects with a pipe 60 between shut-off valves 61 and 62 therein having miter-gear connections with operating rods 63 and 64, respectively, which extend into said space 40. The pipe 60 extends between the vessels 4 and 5 at their bottoms. From a point higher up on the cooker 4, a pipe 65 connects it with the supply-pipe 59, with which, also, a pipe 66 connects the vessel 5, these pipes 65 and 66 containing shut-off valves 67 and 68, respectively, having miter-gear connections with operating rods 69 and 70 likewise extending into said operator's space. A wort-pipe 71 containing a shut-off valve 72 connects the vessel 6 with the vessel 5. In the space 40 is also contained an electrical switch-board, indicated at 73, of ordinary or any suitable construction, the switches on which have wire-connections, as represented, with the respective motors 35, 48 and 52.

To brew wort from rice ("grits") and malt, for example, the particular arrangement of apparatus illustrated in Fig. 1 enables the following procedure to be practiced: The rice is introduced through a supply-pipe 74 into the vessel 4 and boiled therein in water introduced through either pipe 30 or 32, steam for the purpose being admitted through the pipe 60 or 65. Malt introduced into the vessel 5 through an inlet-pipe 75 is mashed therein, the water for the mashing purpose, at the proper temperature regulated by the supply from the pipes 25, 26 and 27 to the chamber 24, with the valve 14 open, running into the mash-tub. It will be understood that all water used passes from the mixer 24 through the meter 12, whence it is distributed through the pipe 13. When the rice-mash is finished, the valves 43 and 11 are opened and the pump 34 is started to pump the rice-mash into the vessel 5 through the pipes 44, 53 and 9. From the kettle 5, the combined mash, when completed, on opening the valves 37 and 56, is pumped into the strainer 6, whence the strained wort, on opening the valve 72, runs through the pipe 71 into the kettle 5 and is boiled therein by heat from steam introduced through the pipe 60 or 66 on opening the valve 62 or 68, the vessel 5 having meantime been washed out with water introduced into it through the pipe 16 on opening the valve 17. In the vessel 5 the wort is suitably hopped, as usual, and the contents of the vessel are thereupon, on opening the valves 37 and 55 transferred, by the action of the pump 34, through the pipes 36, 53 and 54 into the hop-strainer 8, whence the strained hopped wort enters the wort-tank 7. The contents of the wort-tank, on opening a valve 75 in a pipe 76 are discharged through the pipe to a suitable cooler, indicated at 77 in Fig. 1, whence the cooled wort is conducted to the fermentation vats and subsequently treated, all in the usual way to prepare the beer for the market.

It will be understood from the foregoing description of the apparatus represented in Fig. 1 that the stirrers in the vessels 4 and 5 are operated by the motors 48 and 52 under control from the switch-board 73, and that the water for sparging and water and steam for washing purposes are introduced into and discharged from the various vessels through the proper pipe-connections shown on manipulating the proper valves; and since there is no novelty in these practices, all being commonly employed in brewing the wort, there is no need of specifically describing them herein. It will be clear, however, that all the means for controlling and inspecting the operations in the several vessels, including those for opening and closing of the different valves, the switch-board, and means for reading the temperatures and measuring the water are brought to the point 40 and thus within convenient reach of an operator at that point; which constitutes the gist of my invention.

What I claim as new and desire to secure by Letters Patent is—

In a brew-house, an apparatus equipment therefor comprising, in combination, a plurality of intercommunicating vessels all on one floor of the building and adapted to have performed in them the various steps involved in producing the wort, said vessels being equipped with the necessary temperature and liquid gages visible from a common and convenient point on said floor, and controlling means for the operations in said vessels centering thereat, whereby the operations of the several vessels may be controlled from such point, and the condition of the contents of the several vessels be ascertained therefrom, for the purpose set forth.

MAX HENIUS.

In presence of—
L. HEISLAR,
R. A. SCHAEFER.